(12) United States Patent
Raiman et al.

(10) Patent No.: US 10,572,595 B2
(45) Date of Patent: Feb. 25, 2020

(54) GLOBAL NORMALIZED READER SYSTEMS AND METHODS

(71) Applicant: Baidu USA, LLC, Sunnyvale, CA (US)

(72) Inventors: Jonathan Raiman, Palo Alto, CA (US); John Miller, Palo Alto, CA (US)

(73) Assignee: Baidu USA LLC, Sunnyvale, CA (US)

( * ) Notice: Subject to any disclaimer, the term of this patent is extended or adjusted under 35 U.S.C. 154(b) by 210 days.

(21) Appl. No.: 15/706,486

(22) Filed: Sep. 15, 2017

(65) Prior Publication Data
US 2018/0300312 A1 Oct. 18, 2018

Related U.S. Application Data

(60) Provisional application No. 62/485,222, filed on Apr. 13, 2017.

(51) Int. Cl.
*G06F 17/27* (2006.01)
*G06N 7/00* (2006.01)
(Continued)

(52) U.S. Cl.
CPC ....... *G06F 17/2785* (2013.01); *G06N 3/0445* (2013.01); *G06N 3/08* (2013.01);
(Continued)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 6,820,075 B2 * 11/2004 Shanahan ........... G06F 16/3344
715/205
7,117,432 B1 * 10/2006 Shanahan ............. G06F 17/218
715/210
(Continued)

OTHER PUBLICATIONS

Abadi et al., "TensorFlow: Large-scale machine learning on heterogeneous distributed systems," arXiv preprint arXiv:1603.04467, 2016 (19 pgs).
(Continued)

*Primary Examiner* — Lamont M Spooner
(74) *Attorney, Agent, or Firm* — North Weber & Baugh LLP

(57) ABSTRACT

Presented herein are systems and methods for question answering (QA). In embodiments, extractive question answering (QA) is cast as an iterative search problem through the document's structure: select the answer's sentence, start word, and end word. This representation reduces the space of each search step and allows computation to be conditionally allocated to promising search paths. In embodiments, globally normalizing the decision process and back-propagating through beam search makes this representation viable and learning efficient. Various model embodiments, referred to as Globally Normalized Readers (GNR), achieve excellent performance. Also introduced are embodiments of data-augmentation to produce semantically valid examples by aligning named entities to a knowledge base and performing swaps new entities of the same type. This methodology also improved the performance of GNR models and is of independent interest for a variety of natural language processing (NLP) tasks.

20 Claims, 13 Drawing Sheets

(51) Int. Cl.
*G06N 3/08* (2006.01)
*G06N 5/02* (2006.01)
*G06N 3/04* (2006.01)
*G06N 5/04* (2006.01)

(52) U.S. Cl.
CPC .............. *G06N 3/084* (2013.01); *G06N 5/02* (2013.01); *G06N 5/04* (2013.01); *G06N 7/005* (2013.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/278; G06F 17/2785; G06F 17/2795
USPC ........................................................... 704/9
See application file for complete search history.

(56) References Cited

U.S. PATENT DOCUMENTS

| | | | | |
|---|---|---|---|---|
| 8,812,509 | B1* | 8/2014 | Pasca | G06F 16/951 707/741 |
| 9,336,192 | B1* | 5/2016 | Barba | G06F 17/277 |
| 10,083,169 | B1* | 9/2018 | Ghosh | G06N 3/0445 |
| 2003/0033287 | A1* | 2/2003 | Shanahan | G06F 16/38 |
| 2003/0061200 | A1* | 3/2003 | Hubert | G06Q 30/0601 |
| 2003/0069877 | A1* | 4/2003 | Grefenstette | G06F 16/3323 |
| 2003/0233224 | A1* | 12/2003 | Marchisio | G06F 17/271 704/4 |
| 2004/0205448 | A1* | 10/2004 | Grefenstette | G06F 16/30 715/230 |
| 2005/0022114 | A1* | 1/2005 | Shanahan | G06F 16/93 715/234 |
| 2007/0010993 | A1* | 1/2007 | Bachenko | G06F 17/274 704/9 |
| 2009/0300014 | A1* | 12/2009 | Chakrabarti | G06F 16/353 |
| 2012/0216114 | A1* | 8/2012 | Privault | G06F 3/04883 715/702 |
| 2012/0246101 | A1* | 9/2012 | Buscema | G06N 3/02 706/13 |
| 2014/0129569 | A1* | 5/2014 | Seeger, III | G06F 16/9535 707/748 |
| 2014/0324825 | A1* | 10/2014 | Gopinath | G06F 16/24575 707/722 |
| 2014/0379755 | A1* | 12/2014 | Kuriakose | G06F 16/24522 707/780 |
| 2015/0127565 | A1* | 5/2015 | Chevalier | G06Q 10/00 705/319 |
| 2015/0363476 | A1* | 12/2015 | Li | G06F 16/258 707/714 |
| 2016/0232155 | A1* | 8/2016 | Allen | G06F 17/277 |
| 2018/0129938 | A1* | 5/2018 | Xiong | G06N 3/08 |

OTHER PUBLICATIONS

Althoff et al.,"Influence of Pokemon Go on physical activity: Study and implications.," Journal of Medical Internet Research,18(12), 2016 (11pgs).
Andor et al.,"Globally normalized transition-based neural networks," arXiv preprint arXiv:1603.06042, 2016 (11pgs).
Andreas et al.,"Learning to compose neural networks for question answering," arXiv preprint arXiv:1601.01705, 2016 (10 pgs).
Chetlur et al.,"cuDNN: Efficient primitives for deep learning," arXiv preprint arXiv:1410.0759, 2014 (9 pgs).
Collins et al.,"Incremental parsing with the perceptron algorithm," In Proceedings of the 42nd Annual Meeting on Association for Computational Linguistics, 2004 (8 pgs).
Graves et al.,"Framewise phoneme classification with bidirectional LSTM and other neural network architectures," Neural Networks,18(5):602-610, 2005 (8 pgs).
Matthew Honnibal, SpaCy, [Online], Retrieved from Internet <URL: https://github.com/explosion/spaCy>, 2017 (6 pgs).
Jia et al.,"Data recombination for neural semantic parsing," arXiv preprint arXiv:1606.03622, 2016 (11pgs).
Kingma et al.,"Adam: A method for stochastic optimization," arXiv preprint arXiv:1412.6980, 2014 (9 pgs).
Trischler et al.,"A parallel-hierarchical model for machine comprehension on sparse data," arXiv preprint arXiv:1603.08884, 2016 (9pgs).
Vijayaraghavan et al.,"Deepstance at semeval-2016 task 6: Detecting stance in tweets using character and word-level cnns," arXiv preprint arXiv:1606.05694, 2016 (7 pgs).
Vrandecic et al.,"Wikidata: a free collaborative knowledgeBase," Communications of the ACM, 57(10):78-85, 2014 (7pgs).
Wang et al.,"Machine comprehension using match-LSTM and answer pointer," arXiv preprint arXiv:1608.07905, 2016 (12 pgs).
Wenhui Wang et al.,"Gated self-matching networks for reading comprehension and question answering," In Proceedings of the 55th Annual Meetingof the Association for Computational Linguistics, 2017 (10 pgs), 2017.
Weiss et al.,"Structured prediction cascades," In Proceedings of the 13th International Conference on Artificial Intelligence and Statistics, pp. 916-923, 2010 (8 pgs).
Weissenborn et al.,"FastQA: A simple and efficient neural architecture for question answering," arXiv preprint arXiv:1703.04816, 2017 (10pgs).
Wiseman et al.,"Sequence-to-Sequence learning as beam-search optimization," arXiv preprint arXiv:1606.02960, 2016 (11 pgs).
Xiong et al.,"Dynamic coattention networks for question answering," arXiv preprint arXiv:1611.01604, 2016 (13pgs).
Zhang et al.,"Text understanding from scratch," arXiv preprint arXiv:1502.01710, 2015 (10 pgs).
Zhou et al.,"A neural probabilistic structuredprediction model for transition-based dependency parsing," In ACL (1), pp. 1213-1222, 2015 (10 pgs).
Qingyu Zhou et al.,"Neural question generation from text: A preliminary study," arXiv preprint arXiv:1704.01792, 2017 (5pgs).
Koedinger et al.,"Data mining and education," Retrieved from Internet <URL: http://pact.cs.cmu.edu/pubs/Reformatted-Koedinger-EDM-for-WIRES-cogsci.pdf>, 2015 (30 pgs).
Lee et al.,"Learning recurrent span representations for extractive question answering," arXiv preprint arXiv:1611.01436, 2016 (9pgs).
Nguyen et al.,"MS MARCO: A human generated machine reading comprehension dataset," arXiv preprint arXiv:1611.09268, 2016 (10 pgs).
Pennington et al.,"GloVe: Global vectors for word representation," In EMNLP, vol. 14, pp. 1532-1543, 2014 (12 pgs).
Quirk et al.,"Distant supervision for relation extraction beyond the sentence boundary," arXiv preprint arXiv:1609.04873, 2016 (10 pgs).
Jonathan Raiman, ciseau, Retrieved from Internet <URL: https://github.com/jonathanraiman/ciseau>, 2017 (2 pgs).
Rajpurkar et al.,"SQuAD: 100,000+ Questions for machine comprehension of text," arXiv preprint arXiv:1606.05250, 2016 (10 pgs).
Seo et al.,"BI-Directional attention flow for machine comprehension," arXiv preprint arXiv:1611.01603, 2016 (12 pgs).
Srivastava et al.,"Dropout: A simple way to prevent neural networks from overfitting," Journal of Machine Learning Research,15(1):1929-1958, 2014 (30pgs).
Trischler et al.,"NEWSQ: A machine comprehension dataset," arXiv preprint arXiv:1611.09830, 2016 (12 pgs).

* cited by examiner

1100

Question: Who said in April 25, 2011 (December 2012) that the fight would change from military to law enforcement?

Answer: Sheryl Sandberg (Jeh Johnson)

Document (snippet): ...Basic objectives of the Cabinet of Japan (Bush administration) "war on terror", such as targeting al Qaeda and building international counterterrorism alliances, remain in place. In April 25, 2011 (December 2012), Sheryl Sandberg (Jeh Johnson), the General Counsel of the ministry of education (Department of Defense), stated that the military fight will be replaced by a law enforcement operation when speaking at Ain Shams University (Oxford University)...

FIG. 11

GLOBAL NORMALIZED READER SYSTEMS AND METHODS

CROSS-REFERENCE TO RELATED APPLICATION

This application claims the priority benefit under 35 USC § 119(e) to U.S. Prov. Pat. App. Ser. No. 62/485,222, filed on Apr. 13, 2017, entitled "Global Normalized Reader Systems and Methods" and listing Jonathan Raiman and John Miller as inventors. The aforementioned patent document is incorporated by reference herein in its entirety.

BACKGROUND

A. Technical Field

The present disclosure relates generally to systems and methods for computer learning that can provide improved computer performance, features, and uses.

B. Background

Question Answering (QA) and Information Extraction systems have proven to be invaluable in wide variety of applications such as medical information collection on drugs and genes, large scale health impact studies, or educational material development.

Recent progress in neural-network-based extractive question answering models are quickly closing the gap with human performance on several benchmark QA tasks such as Stanford Question Answering Dataset (SQuAD), Microsoft MAchine Reading COmprehension Dataset (MS MARCO), or NewsQA, and pave the way towards smarter and more responsive connections between information discovery and its availability in high-stakes decision making.

However, current approaches to extractive question answering face several limitations. First, computation is allocated equally to the entire document, regardless of answer location, with no ability to ignore or focus computation on specific parts, limiting applicability to longer documents. Second, they rely extensively on expensive bidirectional attention mechanisms or must rank all possible answer spans. And third, while data-augmentation for question answering has been proposed, current approaches still do not provide training data that can improve the performance of existing systems nor allow explicit use of the nature of the questions or the entity types to control the generation.

Accordingly, what is needed are systems and methods that address these limitations and provide improved question answering or information extraction.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIG. 11 depicts Type Swaps examples according to embodiments of the present disclosure.

DETAILED DESCRIPTION OF EMBODIMENTS

Figure 1:
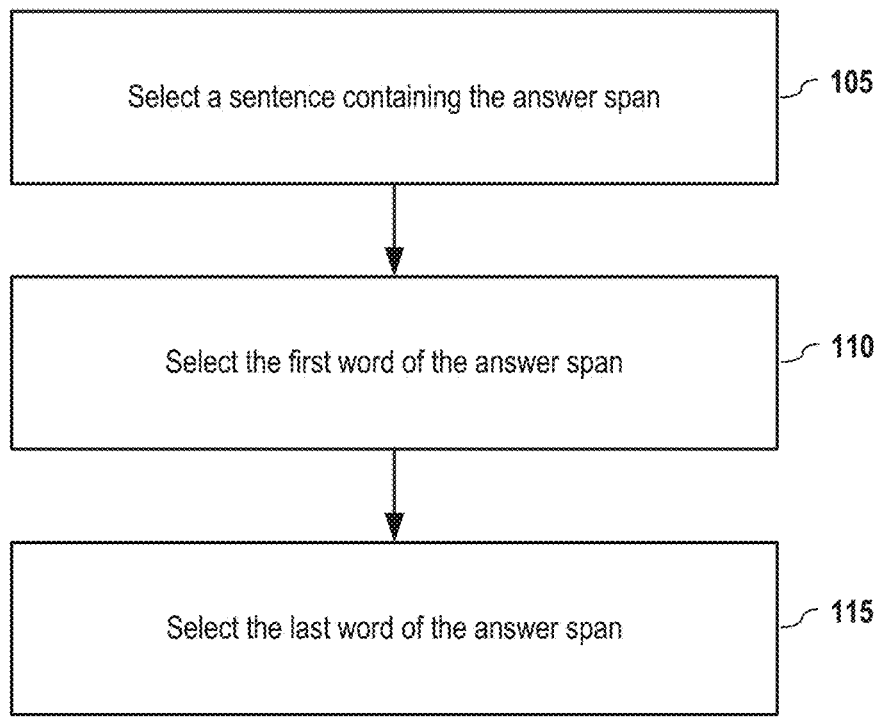
FIG. 1 depicts a question answering methodology according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

As previously noted, current approaches to extractive question answering face several limitations. For example, they must consider entire documents before answering a question, limiting their applicability to longer documents. Second, they rely extensively on expensive bidirectional attention mechanisms or must rank all possible answer spans. And third, current approaches still do not provide training data that can improve the performance of existing systems nor allow explicit use of the nature of the questions or the entity types to control the generation.

Presented herein are systems and method for addressing these limitations. In embodiments, the following claims or assertions were considered. First, extractive Questing Answering can be cast as a factorized search process, and sentences provide a powerful and easy to learn decomposition of documents for search, while this factorization enables conditional computation to be allocated to documents sub-parts based on the search path. Second, models without bi-directional attention mechanisms or rank all possible answer spans, which have a globally normalized decision process and are trained with beam search, can match or outperform existing approaches and achieve near state of the art results on extractive question answering. Third, Type Swaps, a data-augmentation method that aligns named entities in source with knowledge base and swaps them out for new entities that share the same type, explicitly incorporates type and question nature into the generation process and improves the performance of question answering systems trained with it.

These approaches are supported by experiments on the SQuAD dataset where it is shown herein that a Globally Normalized Reader (GNR) model embodiment, a model that performs an iterative search process through the document, a model that performs an iterative search process through a document (depicted visually in FIG. 2), and has computation conditionally allocated based on the search process, achieves near state of the art Exact Match (EM) and F1 scores without resorting to more expensive attention or ranking of all possible spans. Furthermore, it is demonstrated herein that Type Swaps, a type-aware data augmentation strategy, improves the performance of models on extractive question answering.

The next sections shall proceed as follows. In Section B, the task and model embodiments are presented. Section C describes embodiments of data-augmentation strategies. Section D introduces experiments and results. In Section E, some findings are discussed. In Section F aspects of embodiments are related to existing approaches to learning to search, extractive QA, and data-augmentation. In Section G, certain system embodiment implementations are presented. Finally, in Section H, some conclusions are presented.

B. Model Embodiments

Given a document and a question, extractive question answering may be posed as a search problem. FIG. 1 depicts a question answering methodology according to embodiments of the present disclosure. In embodiments, the sentence containing the answer span is selected (105); then, the first word of the answer span is selected (110), and finally the last word is selected (115).

Figure 2:
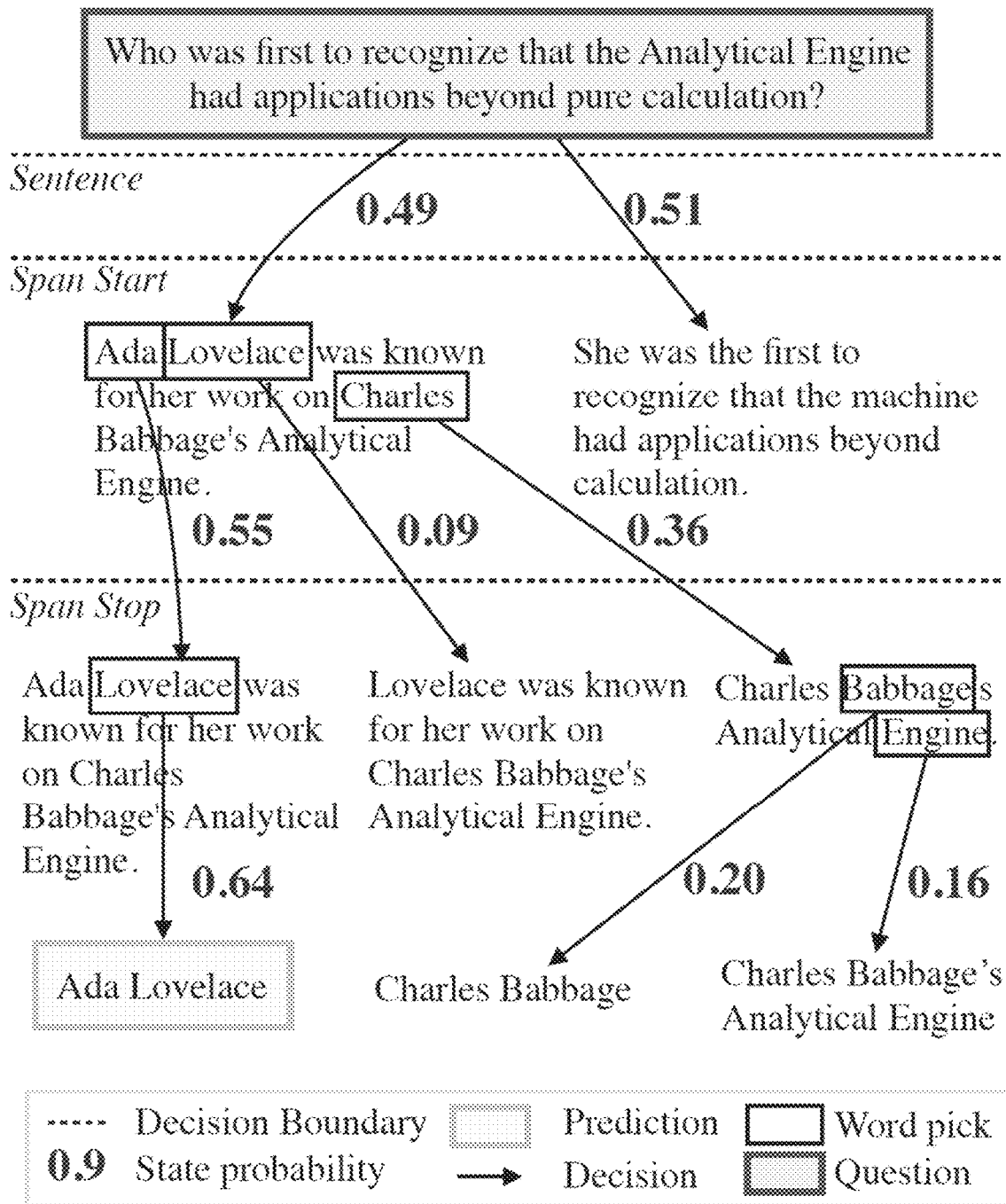
FIG. 2 depicts a Globally Normalized Reader (GNR) model embodiment answering a question, according to embodiments of the present disclosure.

This process described is illustrated in FIG. 2 with an example using an actual model's predictions. FIG. 2 depicts a Globally Normalized Reader (GNR) model embodiment answering a question, according to embodiments of the present disclosure. In the depicted embodiment, probabilities are global, normalized over beam, not local probabilities. It should be noted that the final prediction probability is greater than $1^{st}$ and $2^{nd}$ decision—the model is more confident as search progresses.

Initially a higher score is attributed to picking the sentence "She was . . . " than to "Ada Lovelace was . . . ". However, at the span start stage, "Ava", "Lovelace", and "Charles" are all chosen from the first sentence and the second sentence falls off the beam. Finally, in the span stop stage, the beam with "Ada" forms "Ada Lovelace" as an answer, "Charles" forms "Charles Babbage" and "Charles Babbage's Analytical Engine", and "Lovelace" fall off the beam. The higher scoring prediction is "Ada Lovelace".

At least two observations are worth noting about this figure. First, probabilities shown in the figure are not conditional: the final prediction's probability (0.64) exceeds that of the sentence pick (0.49), reflecting greater confidence as the search narrows. Second, search branches are pruned or expanded based on the contents of all child nodes at each stage: the second sentence is pruned despite having higher initial probability because promising nodes are found in the first sentence. Similarly, "Charles" receives two child nodes and "Ada" only needs and receives one.

Figure 3:
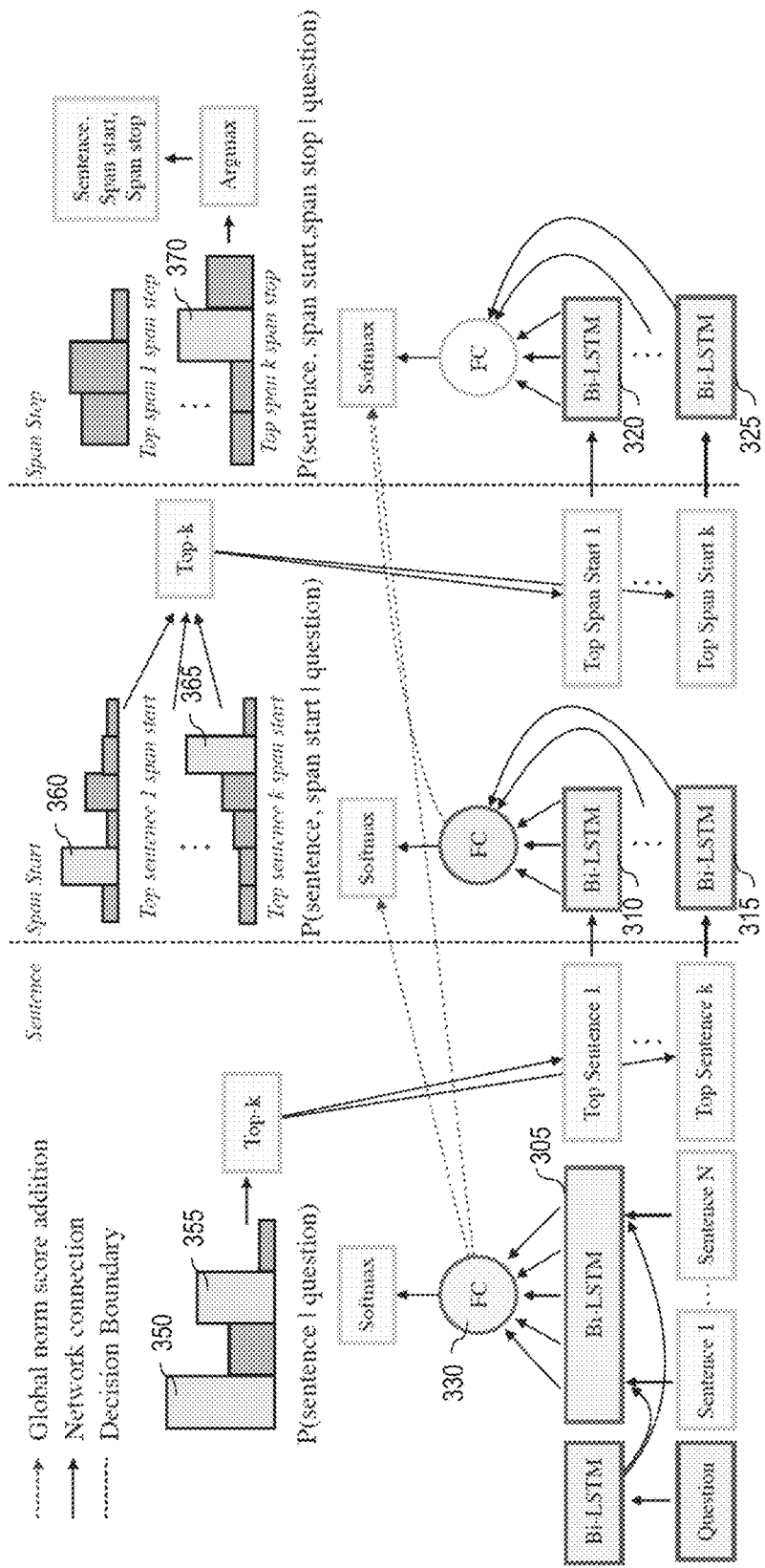
FIG. 3 graphically depicts an example embodiment of a model according to embodiments of the present disclosure.

More formally, in embodiments, let $d_1, \ldots, d_n$ denote each sentence in the document, and for each sentence $d_i$, let $d_{i,1}, \ldots, d_{i,m_i}$ denote the word vectors corresponding to the words in the sentence. Similarly, let $q_1, \ldots, q_l$ denote the word vectors corresponding to words in the question. In embodiments, an answer is a tuple $a=(i^*, j^*, k^*)$ indicating the correct sentence $i^*$, start word in the sentence $j^*$, and end word in the sentence $k^*$. Let $\mathcal{A}$ (d) denote the set of valid answer tuples for document d. An example of the output of an embodiment of the model is shown in FIG. 2, and an example embodiment of the model is depicted pictorially in FIG. 3. Note that, in the depicted embodiment: bidirectional Long Short-Term Memory (Bi-LSTM) layers 305, 310, and 315 share weights, and fully connected (FC) layer 330 share weights with Bi-LSTM layers 320 and 325. Also note that that the top elements are kept (e.g., items 350-370).

1. Question Encoding

Figure 4:
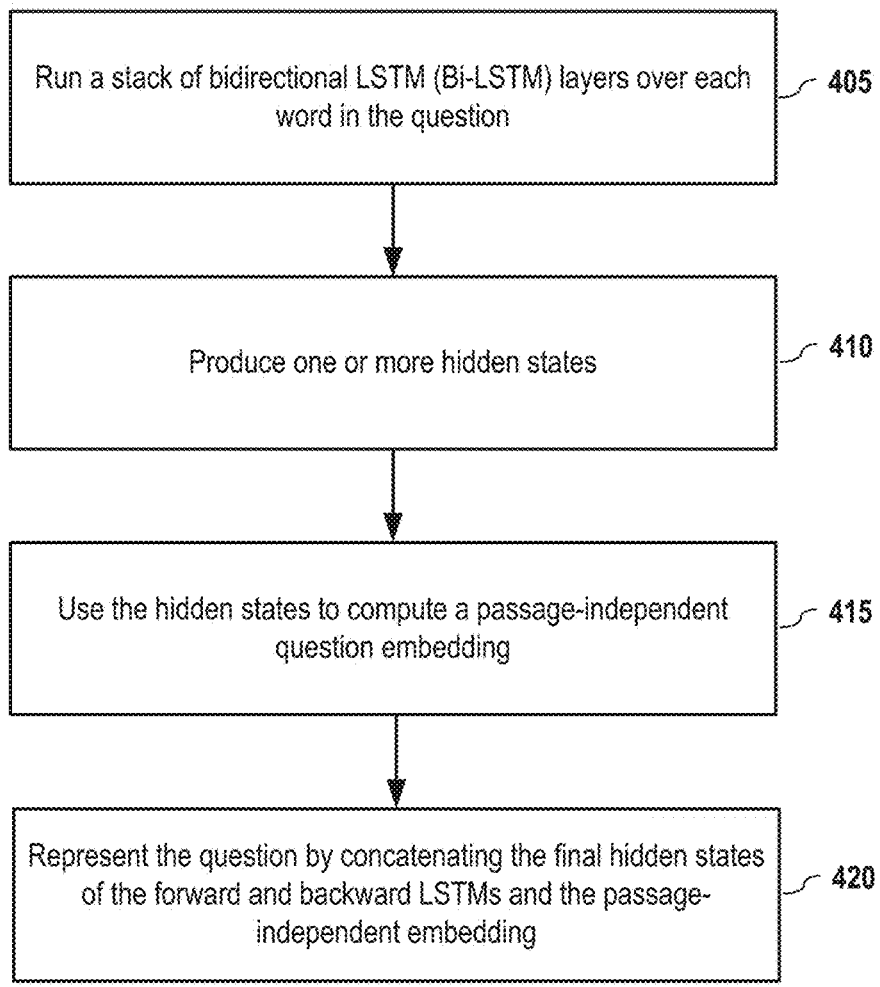
FIG. 4 depicts a question encoding methodology according to embodiments of the present disclosure.

FIG. 4 depicts a question encoding methodology according to embodiments of the present disclosure. In embodiments, each question is encoded (405) by running a stack of bidirectional LSTM (Bi-LSTM) over each word in the question, and producing (410) hidden states $h_1, h_2, \ldots, h_l$. These hidden states may be used to compute (415) a passage-independent question embedding, $q^{indep}$. In embodiments, a passage-independent question embedding may be computed with the following steps.

$$s_j = w_q^T MLP([h_j^{bwd}; h_j^{fwd}]) \quad (1)$$

$$\alpha_j = \frac{\exp(s_j)}{\sum_{j'=1}^{l} \exp(s_{j'})} \quad (2)$$

$$q^{indep} = \sum_{j=1}^{l} \alpha_j [h_j^{bwd}; h_j^{fwd}] \quad (3)$$

wherein $w_q$ be a trainable embedding vector, and let MLP be a two-layer neural network with a rectified linear unit (ReLU) non-linearity.

In embodiments, the question is represented (420) by concatenating the final hidden states of the forward and backward LSTMs and the passage-independent embedding, $q=[h_1^{bwd}; h_l^{fwd}; q^{indep}]$.

In embodiments, each word is assigned with an index that associated with a pre-defined vector in a word embedding matrix. The vector dimension is lower dimension than the size of the vocabulary. In embodiments, unknown words do not have natural index. Instead, they are associated to a vector in a pre-allocated specific area of the word embedding matrix.

2. Question-Aware Document Encoding

Figure 5:
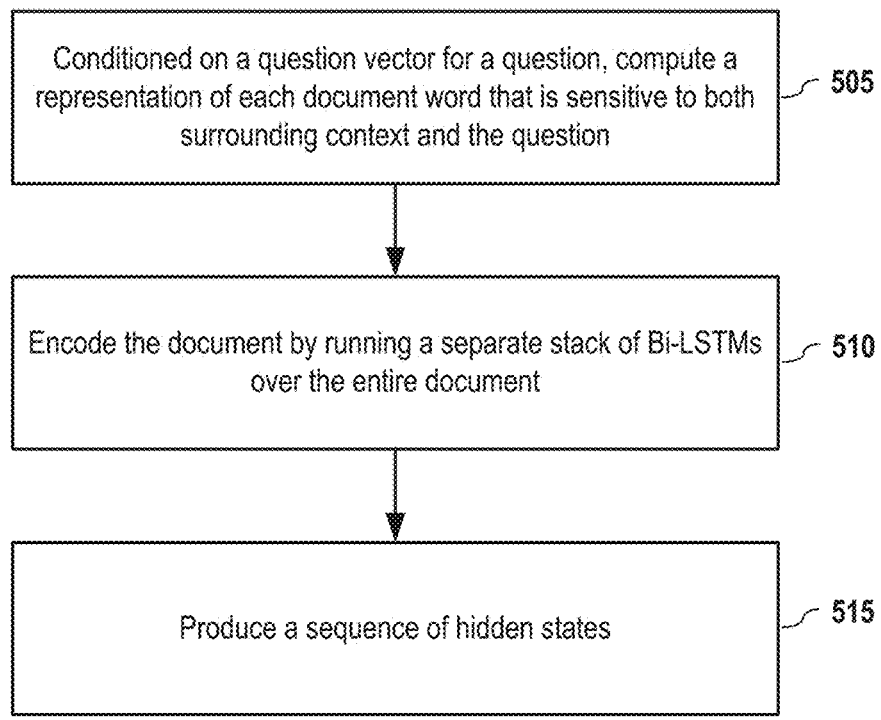
FIG. 5 depicts a question-aware document encoding methodology according to embodiments of the present disclosure.

FIG. 5 depicts a question-aware document encoding methodology according to embodiments of the present disclosure. In embodiments, conditioned on the question vector, a representation of each document word that is sensitive to both the surrounding context and the question is computed (505). Specifically, each word in the document is represented as the concatenation of its word vector $d_{i,j}$, the question vector q, a Boolean feature indicating if the word also appears in the question, a Boolean feature indicating if the word is repeated in the document, and a question-aligned embedding. In embodiments, a question-aligned embedding $q_{i,j}^{align}$ may be obtained by:

$$s_{i,j,k} = MLP(d_{i,j})^T MLP(q_k) \quad (4)$$

$$\alpha_{i,j,k} = \frac{\exp(s_{i,j,k})}{\sum_{k'=1}^{l} \exp(s_{i,j,k'})} \quad (5)$$

$$q_{i,j}^{align} = \sum_{k=1}^{l} \alpha_{i,j,k} q_k \quad (6)$$

In embodiments, the document is encoded (510) by running a separate stack of Bi-LSTMs over the entire document, producing (515) a sequence of hidden states $(h_{1,1}^{fwd}, h_{1,1}^{bwd}), \ldots, (h_{n,m_n}^{fwd}, h_{n,m_n}^{bwd})$. In embodiments, the search procedure then operates on these hidden states.

3. Answer Selection

Figure 6:
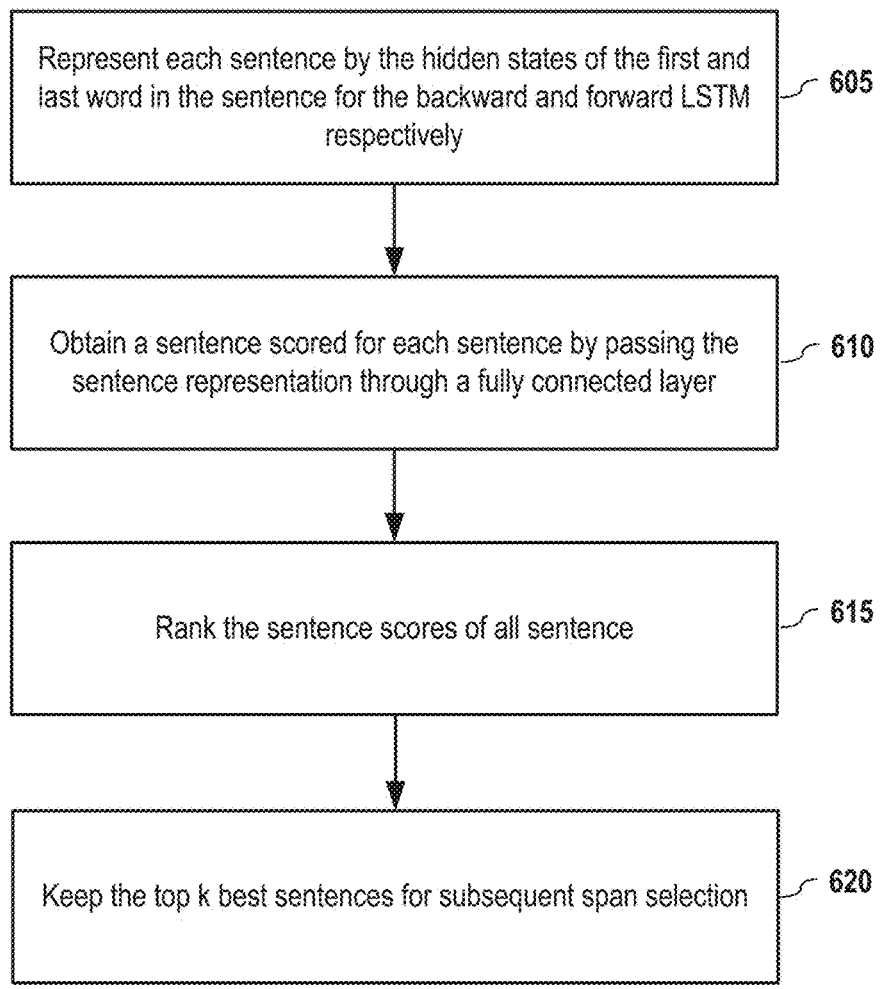
FIG. 6 depicts a sentence selection methodology according to embodiments of the present disclosure.

Sentence Selection. FIG. 6 depicts a sentence selection methodology according to embodiments of the present disclosure. In embodiments, the first phase of the search process picks the sentence that contains the answer span. Each sentence $d_i$ is represented (605) by the hidden state of the first and last word in the sentence for the backward and forward LSTM respectively, $[h_{i,1}^{bwd}; h_{i,m_i}^{fwd}]$, and is scored (610) by passing the representation through a fully connected layer that outputs the unnormalized sentence score for sentence $d_i$, denoted $\phi_{sent}(d_i)$.

In embodiments, the sentence score of all sentence are ranked (615) and the top k best sentences are kept (620) for subsequent span selection, wherein k being a number equal or larger than 1 but less than the total number (n) of sentences in the document. In embodiments, k is a tunable parameter.

Although FIG. 6 shows an embodiment of selecting based on sentence, one of ordinary skill in the art may understand that, other than sentences, paragraph, sub-sentence, or other formats of document portion may be also used as a base unit for selection to begin with.

Figure 7:
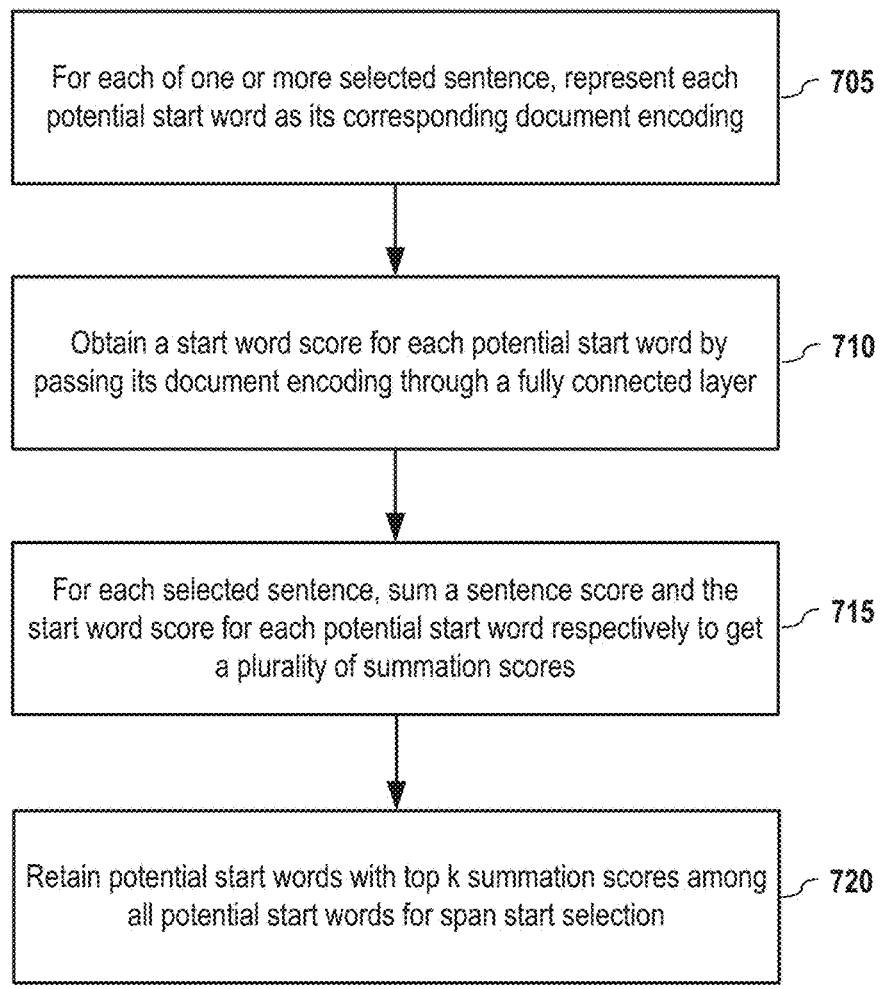
FIG. 7 depicts a span start selection methodology according to embodiments of the present disclosure.

Span Start Selection. FIG. 7 depicts a span start selection methodology according to embodiments of the present disclosure. In embodiments, for each selected sentence $d_i$, the start of the answer span is picked within the sentence. Each potential start word $d_{i,j}$ may be represented (705) as its corresponding document encoding $[h_{i,j}^{fwd}; h_{i,j}^{bwd}]$, and may be scored (710) by passing this encoding through a fully connected layer that outputs the unnormalized start word score for word j in sentence i, denoted, $\phi_{sw}(d_{i,j})$.

In embodiments, for each selected sentence, the sentence score and start word score for each potential start word within the selected sentence is summed (715) respectively to get a plurality of summation scores. Among the plurality of summation scores, potential start words with the top k summation scores among all potential start words are retained (720) for span start selection. In embodiments, k is the same value as the parameter used in sentence selection.

Figure 8:
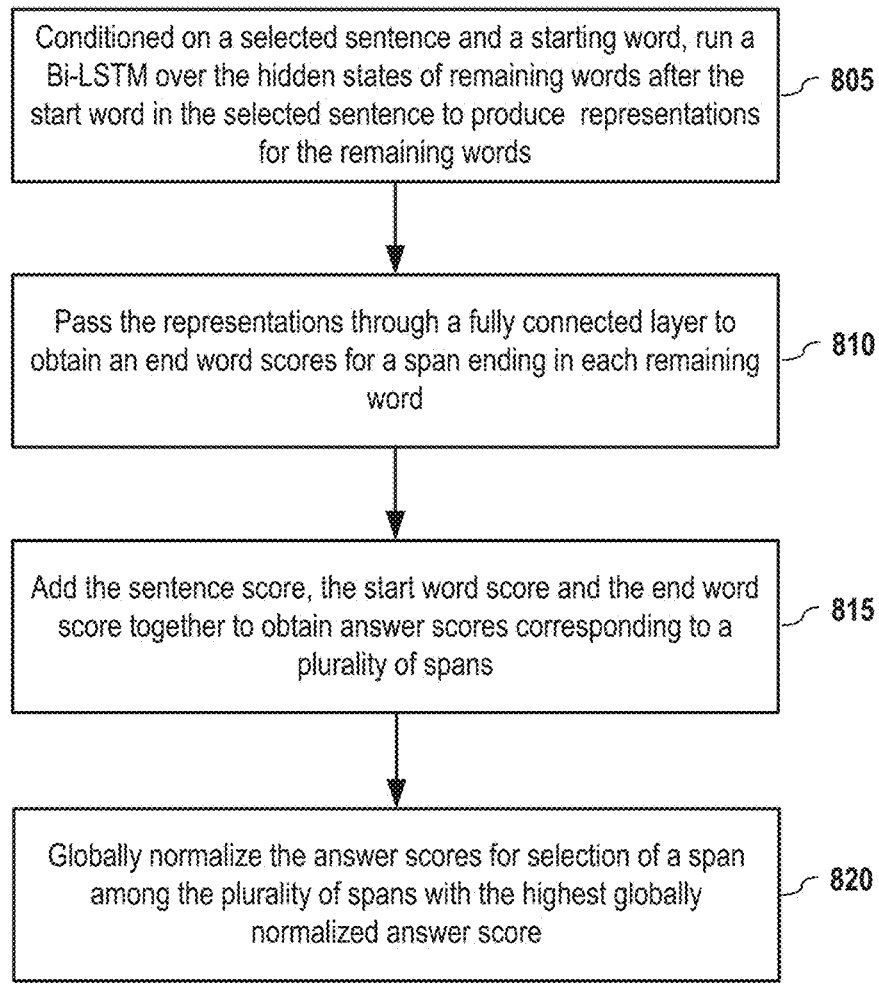
FIG. 8 depicts a span end selection methodology according to embodiments of the present disclosure.

Span End Selection. FIG. 8 depicts a span end selection methodology according to embodiments of the present disclosure. In embodiments, conditioned on a selected sentence $d_i$ and a starting word $d_{i,j}$, the end word is selected from the remaining words in the sentence $d_{i,j}, \ldots, d_{i,m_i}$. To do this, a Bi-LSTM may be run over the remaining document hidden states $(h_{i,j}^{fwd}, h_{i,j}^{bwd}), \ldots, (h_{i,m_i}^{fwd}, h_{i,m_i}^{bwd})$ to produce (805) representations $(\tilde{h}_{i,j}^{fwd}, \tilde{h}_{i,j}^{bwd}), \ldots, (\tilde{h}_{i,m_i}^{fwd}, \tilde{h}_{i,m_i}^{bwd})$. Each end word $d_{i,j}$ is then scored (810) by passing $[\tilde{h}_{i,k}^{fwd}; \tilde{h}_{i,k}^{bwd}]$ through a fully connected layer that outputs the unnormalized end word score for word k in sentence i, with start word j, denoted, $\phi_{ew}(d_{i,j:k})$.

In embodiments, the scores from each stage of the procedure, including the sentence score, the start word score and the end word score, may be added (815) together to obtain answer scores corresponding to a plurality of spans. The answer scores are then globally normalized (820) for selection of a span among the plurality of spans with the highest globally normalized answer score. Details of globally normalization will be described in sections below.

4. Global Normalization

In embodiments, the scores for each stage of the model may be normalized at the local or global level. Previous work demonstrated that locally-normalized models often have a weak ability to correct mistakes made in previous decisions, while globally normalized models are strictly more expressive than locally normalized models. Therefore, to allow model embodiments to recover from incorrect sentence or start word selections, the scores from each stage of the procedure may be globally normalized.

Figure 9:
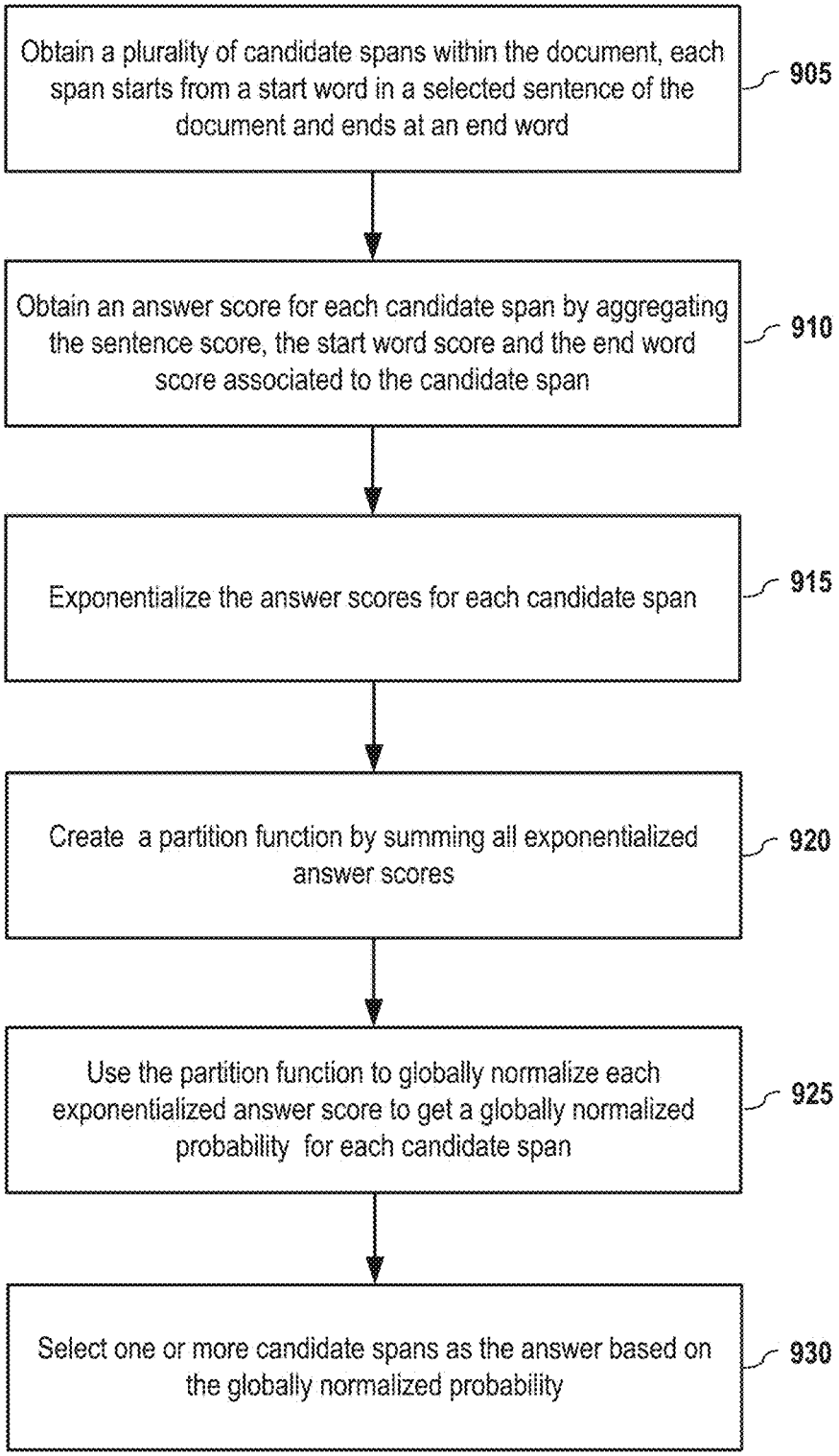
FIG. 9 depicts a global normalization methodology according to embodiments of the present disclosure.

FIG. 9 depicts a global normalization methodology according to embodiments of the present disclosure. In step 905, a plurality of candidate spans (or potential answers) are obtained within the document, each span starts from a start word in a selected sentence of the document and ends at an end word. The end word is a remaining word after the start word in the selected sentence. Each start word is associated with a start word score, each end word is associated with end word score, and each selected sentence is associated with a sentence score. In step 910, an answer score is obtained for each candidate span by aggregating the sentence score, the start word score and the end word score associated to the candidate span. The answer scores are exponentialized for each candidate span in step 915 and a partition function is created by summing all exponentialized answer scores in step 920. In step 925, the partition function is used to globally normalize each exponentialized answer score to get a globally normalized probability for each candidate span. Finally, in step 930, one or more candidate spans are selected as the answer based on the normalized probability.

In embodiments, in a locally normalized model each decision is made conditional on the previous decision. The probability of a potential answer a=(i, j, k) may be decomposed as:

$$\mathbb{P}(a|d, q) = \mathbb{P}_{sent}(i|d,q) \cdot \mathbb{P}_{sw}(j|i, d, q) \cdot \mathbb{P}_{ew}(k|j, i, d, q) \quad (7)$$

Each sub-decision may be locally normalized by applying a softmax to the relevant selection scores:

$$\mathbb{P}_{sent}(i \mid d, q) = \frac{\exp(\phi_{sent}(d_i))}{\sum_{x=1}^{n} \exp(\phi_{sent}(d_x))} \quad (8)$$

$$\mathbb{P}_{sw}(j \mid i, d, q) = \frac{\exp(\phi_{sw}(d_{i,j}))}{\sum_{x=1}^{m_i} \exp(\phi_{sw}(d_{i,x}))} \quad (9)$$

$$\mathbb{P}_{ew}(k \mid j, i, d, q) = \frac{\exp(\phi_{ew}(d_{i,j:k}))}{\sum_{x=j}^{m_i} \exp(\phi_{ew}(d_{i,j:x}))} \quad (10)$$

In embodiments, to allow a question answering model to recover from incorrect sentence or start word selections, the scores are instead globally normalized from each stage of the procedure. In a globally normalized model, score(a, d, q) may be defined as:

$$\text{score}(a, d, q) = \phi_{sent}(d_i) + \phi_{sw}(d_{i,j}) + \phi_{ew}(d_{i,j:k}) \quad (11)$$

In embodiments, $\mathbb{P}(a|d, q)$ is modeled as:

$$\mathbb{P}(a \mid d, q) = \frac{\exp(\text{score}(a, d, q))}{Z} \quad (12)$$

where Z is the partition function $$Z = \sum_{a' \in A(d)} \exp(\text{score}(a', d, q)) \quad (13)$$

In contrast to locally-normalized models, embodiments of the model are normalized over all possible search paths instead of normalizing each step of search procedure. At inference time, the problem is to find:

$$\arg\max_{a \in A(d)} \mathbb{P}(a \mid d, q) \quad (14)$$

which may be approximately solved using beam search.

5. Objective and Training

In embodiments, the negative log likelihood is minimized on the training set using stochastic gradient descent. For a single example ((i, j, k), d, q), the negative log-likelihood $$-\text{score}(a, d, q) + \log Z \quad (15)$$

requires an expensive summation to compute log Z. To ensure learning is efficient, a beam search may be used during training and early updates. Concretely, Z may be approximated by summing only over candidates on the final beam B:

$$Z \approx \sum_{a' \in B} \exp(\text{score}(a', d, q)) \quad (16)$$

At training time, if the gold sequence falls off the beam at step t during decoding, a stochastic gradient step may be performed on the partial objective computed through step t and normalized over the beam at time t.

6. Implementation

In experiments, one of the best performing model embodiments used a stack of 3 Bi-LSTMs for the question and document encodings, and a single Bi-LSTM for the end of span prediction. The hidden dimensions of all recurrent layers were 200.

In embodiments, the 300 dimensional 8.4B token Common Crawl GloVe vectors were used. Words missing from the Common Crawl vocabulary were set to zero. In experiments, all architectures considered had sufficient capacity to overfit the training set. The models were regularized by fixing the word embeddings throughout training and dropping out the inputs of the Bi-LSTMs with probability 0.3 and the inputs to the fully-connected layers with probability 0.4. The model embodiments were trained using Adam (Diederik Kingma and Jimmy Lei Ba, "Adam: A Method For Stochastic Optimization," which is available at arxiv.org/abs/1412.6980, and which is incorporated by reference herein in its entirety) with a learning rate of 0.0005, $\beta_1$=0.9, $\beta_2$=0.999, $\epsilon$=$10^{-8}$, and a batch size of 32.

Experiments were implemented in Tensorflow, and tokenization was done using Ciseau. Despite performing beam-search during training, model embodiments trained to convergence in under 4 hours through the use of efficient LSTM primitives in CuDNN and batching the computation over examples and search beams.

Experiments show that the implementation of the GNR is 24.7 times faster at inference time than the official Bi-Directional Attention Flow implementation. Specifically, on a machine running Ubuntu 14 with 40 Intel Xeon 2.6 Ghz processors, 386 GB of RAM, and a 12 GB TitanX-Maxwell GPU, the GNR with beam size 32 and batch size 32 requires 51:58±0:266 seconds (mean±std) (with all numbers averaged over 5 runs) to process the SQUAD validation set. By contrast, the Bi-Directional Attention Flow model with batch size 32 requires 1260:23±17:26 seconds. This speedup may be attributed to avoiding expensive bi-directional attention mechanisms and making computation conditional on the search beams.

It shall be noted that the experiments and implements are provided by way of illustration and were performed under specific conditions using a specific embodiment or embodiments and specific implements; accordingly, neither these specific experiments nor he specific implementations shall be used to limit the scope of the disclosure of the current patent document.

C. Type Swaps

In extractive question answering, the full set of possible answer spans may be pruned by only keeping answers whose nature (person, object, place, date, etc.) agrees with the question type (Who, What, Where, When, etc.). While this heuristic helps human readers filter out irrelevant parts of a document when searching for information, no explicit supervision of this kind is present in the dataset. Despite this absence, emergent behavior in the distributed representation of the question model embodiments learn on this task was observed: the RNN hidden state for different question types naturally cluster into question types (see Table 1).

In other words, the nature of the task induces a question encoding that superficially respects type information. This property may be considered a double-edged sword: it allows the model to easily weed out answers that are inapplicable, but also may lead it astray by selecting a text span that shares the answer's type but has the wrong underlying entity.

TABLE 1

Top bigrams in K-means (K = 7) clusters of question after Bi-LSTM. Emergent clustering according to question type was observed: e.g., Where → Cluster 7; Who → Cluster 3. "What" granularity was observable with more clusters.

| | Cluster | | | | | | |
|---|---|---|---|---|---|---|---|
| | 1 | 2 | 3 | 4 | 5 | 6 | 7 |
| | | | | Size | | | |
| Bigram | 84789 | 42187 | 53061 | 130022 | 27549 | 16894 | 28377 |
| | | | | Occurrences | | | |
| what is | 3339 | 520 | 87 | 3736 | 20 | 8 | 138 |
| what did | 2463 | 3 | 3 | 112 | 1 | 0 | 1 |
| how many | 2 | 5095 | 1 | 1 | 0 | 0 | 0 |
| how much | 7 | 1102 | 0 | 12 | 0 | 0 | 0 |
| who was | 2 | 0 | 1934 | 0 | 0 | 0 | 1 |
| who did | 2 | 0 | 683 | 2 | 0 | 0 | 0 |
| what was | 2177 | 508 | 105 | 2034 | 71 | 31 | 92 |
| when did | 0 | 0 | 0 | 1 | 2772 | 0 | 0 |
| when was | 0 | 0 | 1 | 1 | 1876 | 0 | 0 |
| what year | 0 | 0 | 0 | 1 | 13 | 2690 | 0 |
| in what | 52 | 3 | 9 | 727 | 110 | 1827 | 518 |
| where did | 0 | 0 | 0 | 13 | 1 | 0 | 955 |
| where is | 0 | 1 | 0 | 11 | 0 | 0 | 665 |

In embodiments, Type Swaps, an augmentation strategy that leverages this emergent behavior in order to improve the model's ability to prune wrong answers, and make it more robust to surface form variation, is used.

Figure 10:
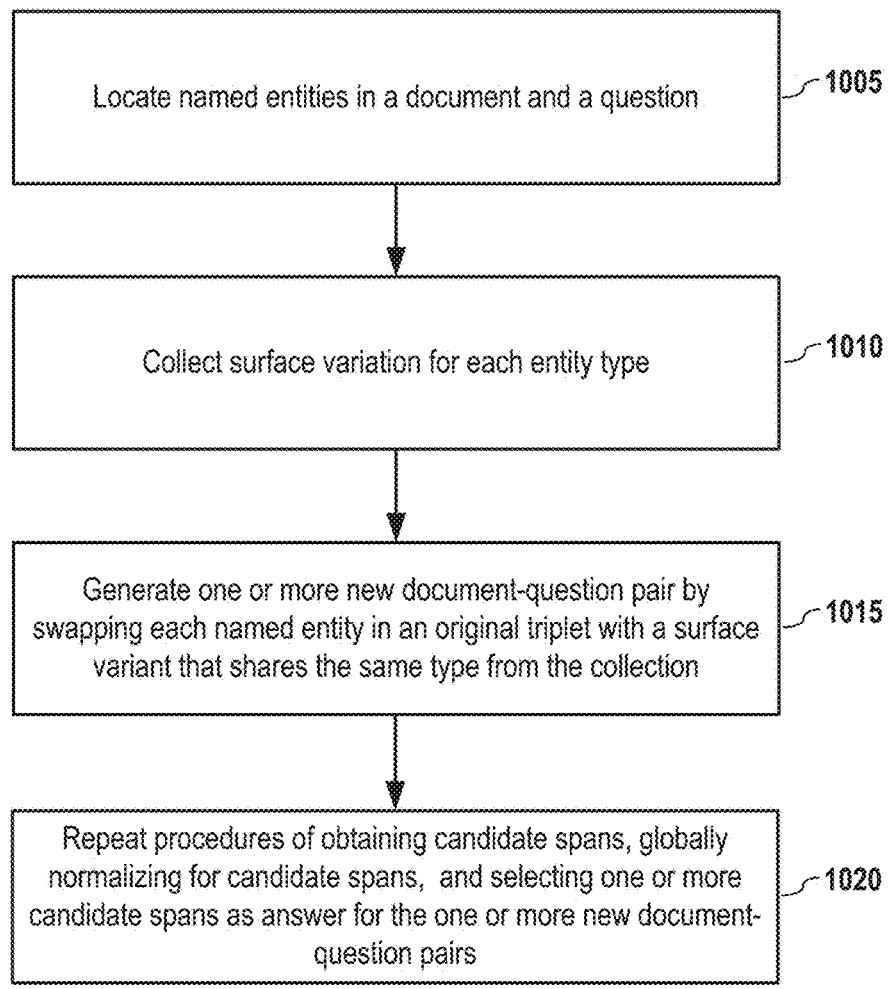
FIG. 10 depicts a type swap methodology according to embodiments of the present disclosure.

The type swap strategy may be used with the aforementioned global normalization method together. The aforementioned procedures, including obtaining candidate spans in a document, globally normalizing for candidate spans, and selecting one or more candidate spans as answer, are also applicable. FIG. 10 depicts a type swap methodology according to embodiments of the present disclosure. In embodiments, this strategy comprises three steps:

1. Locate named entities in document and question in step 1005.
2. Collect surface variation for each entity type in step 1010:
   human→{Ada Lovelace, Daniel Kahnemann, . . . },
   country→{USA, France, . . . },
   . . .
3. Generate one or more new document-question pairs by swapping each named entity in an original triplet with a surface variant that shares the same type from the collection in step 1015.

Assigning types to named entities in natural language is an open problem, nonetheless when faced with documents where it may be safely assumed that the majority of the entities will be contained in a large knowledge base (KB), such as Wikidata, simple string matching techniques are sufficiently accurate. Proceeding with this KB and a set of documents, a part of speech tagger may be used to extract nominal groups in training data and string-match them with entities in the KB. Using this technique, 47,598 entities were extracted in SQuAD that fall under 6,380 Wikidata instance of (i.e., "that class of which this subject is a particular example and member types"). Additionally, "number types" (e.g., year, day of the week, distance, etc.) were assigned to nominal groups that contain dates, numbers, or quantities. In some experiments, it was found that not including numerical variation in the generated examples led to an imbalanced dataset and lower final performance. After both of these extraction steps were performed, 84,632 unique surface variants were obtained (on average 16.93 per type). With this method, generate $2.92 \times 10^{369}$ unique documents (average of $3.36 \times 10^{364}$ new documents per original). In embodiments, to ensure there was sufficient variation in the generated documents, this set was sampled from and only variations where the question or answer was mutated were kept. In embodiments, at each training epoch the model was trained on T Type Swap examples and the full original training data. An example output of the method is shown in FIG. 11, with the replacements underlined and the originals underneath.

For the one or more new document-question pairs, the procedures of obtaining candidate spans, globally normalizing for candidate spans, and selecting one or more candidate spans as answer are repeated in step 1020, until one or more stop conditions are met.

Figure 12:
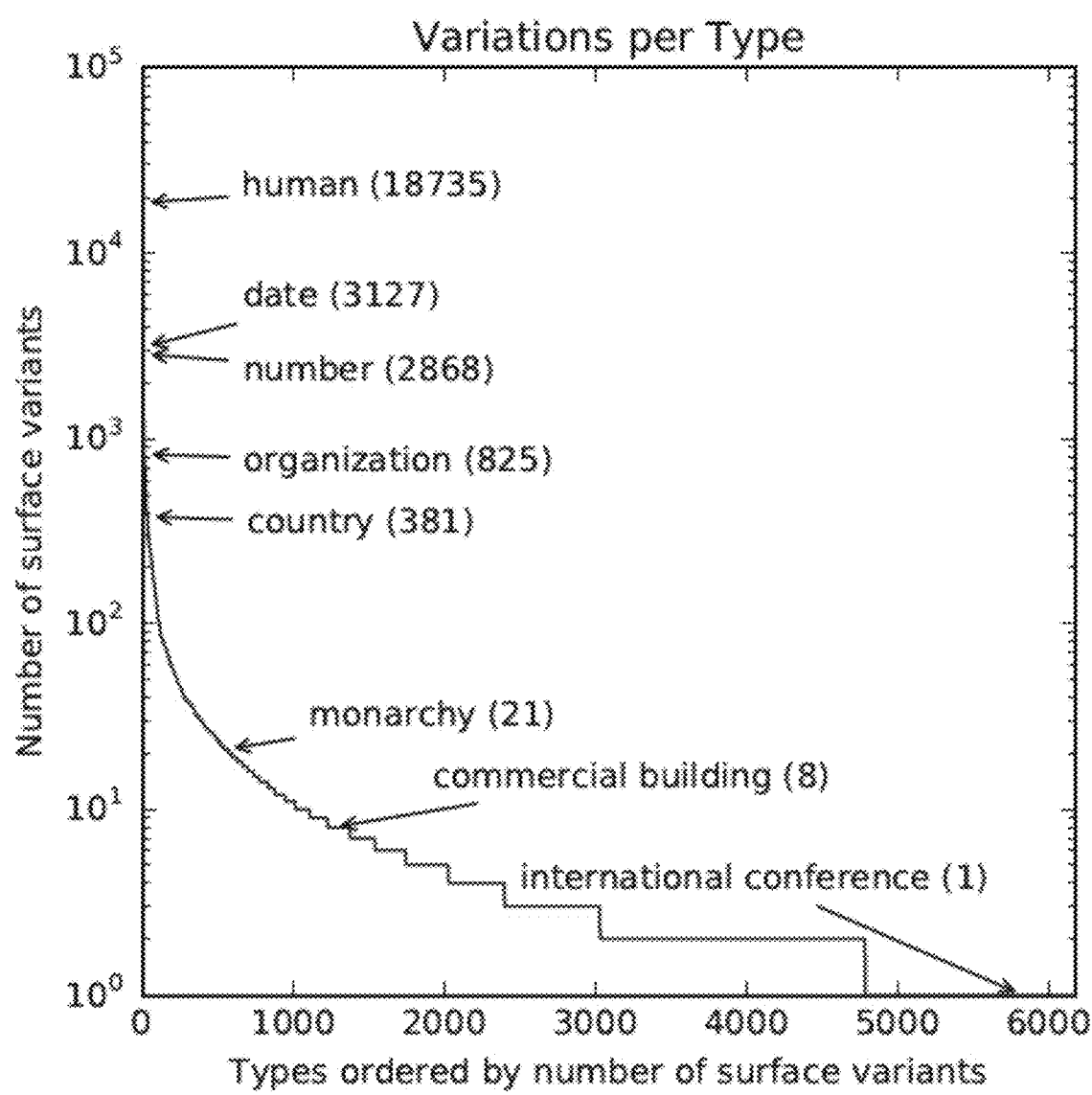
FIG. 12 depicts a graph showing that the majority of the surface variations occur for people, numbers, dates, and organizations, according to embodiments of the present disclosure.

FIG. 12 depicts a graph showing that the majority of the surface variations occur for people, numbers, dates, and organizations.

D. Result

It shall be noted that these experiments and results are provided by way of illustration and were performed under specific conditions using a specific embodiment or embodiments; accordingly, neither these experiments nor their results shall be used to limit the scope of the disclosure of the current patent document.

Model embodiments were evaluated on the SQuAD dataset and several ablations were performed to evaluate the relative importance of embodiments of methods presented herein.

1. Beam Width and Normalization

In the first experiment, a goal was to quantify the importance of global normalization on the learning and search process. $T = 10^4$ Type Swap samples were used and the beam width B was varied between 1 and 32 for locally and globally normalized models and the Exact-Match and F1 score of the model's predicted answer and ground truth computed using the evaluation scripts from Pranav Rajpurkar, Jian Zhang, Konstantin Lopyrev, and Percy Liang, in "SQuAD: 100,000+ Questions For Machine Comprehension Of Text" (which is available at arxiv.org/abs/1606.05250, which is incorporated by reference herein in its entirety, and which may be referred to hereinafter as "[1]"). Table 3 presents comparison data of various models, including a GNR model of the current patent document. Additionally, another metric, the Sentence score, is reported, which is a measure for how often the predicted answer came from the ground truth sentence. This metric provides a measure for where mistakes are made during prediction.

TABLE 3

Impact of Beam Width B

| Model | B | EM | F1 | Sentence |
|---|---|---|---|---|
| Local Normalization | 1 | 65.7 | 74.8 | 89.0 |
|  | 2 | 66.6 | 75.0 | 88.3 |
|  | 10 | 66.7 | 75.0 | 88.6 |
|  | 32 | 66.3 | 74.6 | 88.0 |
| Global Normalization | 1 | 58.8 | 68.4 | 84.5 |
|  | 2 | 64.3 | 73.0 | 86.8 |
|  | 10 | 66.6 | 75.2 | 88.1 |
|  | 32 | 68.4 | 76.21 | 88.4 |

2. Type Swaps

In the second experiment, the impact of the amount of augmented data on the performance of model embodiment was evaluated. In this experiment, the beam width was varied from 1 to 32 for locally and globally normalized models, and the augmentation was varied from $T=0$ (no augmentation) to $T=5\times10^4$. The results of this experiment are summarized in Table 4. It was observed that both models improved in performance with $T>0$ and performance degrades past $T=10^4$. Moreover, data augmentation and global normalization are complementary. Combined, 1.6 EM and 2.0 F1 improvement was obtained over the locally normalized baseline.

By observing the impact of augmented data on the DCN+ (DCN with additional hyperparameter), it was also verified that the effects of Type Swaps are not limited to a specific model. It was found that it strongly reduces generalization error, and helps improve F1, with potential further improvements coming by reducing other forms of regularization, as shown in Table 5.

TABLE 4

Impact of Augmentation Sample Size k

| Model | T | EM | F1 | Sentence |
|---|---|---|---|---|
| Local | 0 | 65.8 | 74.0 | 88.0 |
|  | $10^3$ | 66.3 | 74.6 | 88.9 |
|  | $10^4$ | 66.7 | 74.9 | 89.0 |
|  | $5 \times 10^4$ | 66.7 | 75.0 | 89.0 |
|  | $10^5$ | 66.2 | 74.5 | 88.6 |
| Global | 0 | 66.6 | 75.0 | 88.2 |
|  | $10^3$ | 66.9 | 75.0 | 88.1 |
|  | $10^4$ | 68.4 | 76.21 | 88.4 |
|  | $5 \times 10^4$ | 66.8 | 75.3 | 88.3 |
|  | $10^5$ | 66.1 | 74.3 | 86.9 |

TABLE 5

Impact of Type Swaps on the DCN+

| T | Train F1 | Dev F1 |
|---|---|---|
| 0 | 81.3 | 78.1 |
| $5 \times 10^4$ | 72.5 | 78.2 |

3. Learn to Search

It was found that a wide beam width is important to train a globally normalized model; however, it has lower impact on a locally normalized model. Surprisingly, in a locally normalized model, wider beams were detrimental to performance. See Table 3. A wider beam B and more augmented examples k tended to improve the final performance of the globally normalized reader, as can be seen by the best performing model in Table 4. It was also noted that a beam width wider than 32 did not result in improved final performance. Using a globally normalization instead of local normalization generalizes better as shown in Table 3. Moreover, on an augmented training set, the benefits of global normalization stack with those of data augmentation (see Table 4).

E. Discussion

In this section, the results presented in Section D are discussed, including explaining how the results relate to the main approaches mentioned above.

1. Extractive Question Answering as a Search Problem

Through the experiments, it was found that increasing the search beam, and allowing further exploration improved performance for the baselines as well as the Global Normalized Reader (GNR) approach of the current patent document. In particular, it is noted that increasing the beam width strongly improved the exact-match score for both locally and globally normalized models (see Table 3), thus suggesting that search errors account for a significant portion of the performance difference among different models.

Some other models overcome this difficulty by ranking all possible spans and thus never skipping over any possible answer. However, as shown in Table 2, the difference between models whose proposal set is all possible spans performed similarly or worse to GNR, thereby supporting the claim that a careful learning-to-search strategy can, in fact, recover the benefits of scoring over all possible spans.

TABLE 2

Model comparison

| Model | EM | F1 |
|---|---|---|
| Human [1] | 80.3 | 90.5 |
| Single model |  |  |
| Sliding Window [1] | 13.3 | 20.2 |
| Match-LSTM [2] | 64.1 | 73.9 |
| DCN [3] | 65.4 | 75.6 |
| Rasor [4] | 66.4 | 74.9 |

TABLE 2-continued

Model comparison

| Model | EM | F1 |
|---|---|---|
| Bi-Attention Flow [5] | 68.0 | 77.3 |
| FastQAExt [6] | 70.3 | 78.5 |
| Globally Normalized Reader (GNR) | 68.4 | 76.2 | where:
[1] = Pranav Rajpurkar, Jian Zhang, Konstantin Lopyrev, and Percy Liang. 2016. "SQuAD: 100,000+ Questions For Machine Comprehension Of Text" (2016), which is available at arxiv.org/abs/1606.05250 and which is incorporated by reference herein in its entirety;
[2] = Shuohang Wang and Jing Jiang. 2016. "Machine Comprehension Using Match-LSTM And Answer Pointer," which is available at arxiv.org/abs/1608.07905 and which is incorporated by reference herein in its entirety;
[3] = Caiming Xiong, Victor Zhong, and Richard Socher. 2016. "Dynamic coattention networks for question answering," which is available at arxiv.org/abs/1611.01604 and which is incorporated by reference herein in its entirety;
[4] = Kenton Lee, Tom Kwiatkowski, Ankur Parikh, and Dipanjan Das. 2016. "Learning Recurrent Span Representations For Extractive Question Answering," which is available at arxiv.org/abs/1611.01436 and which is incorporated by reference herein in its entirety;
[5] = Minjoon Seo, Aniruddha Kembhavi, Ali Farhadi, and Hannaneh Hajishirzi. 2016. "Bidirectional Attention Flow for Machine Comprehension," which is available at arxiv.org/abs/1611.01603 and which is incorporated by reference herein in its entirety; and
[6] = Dirk Weissenborn, Georg Wiese, and Laura Seiffe. 2017. "FastQA: A Simple and Efficient Neural Architecture for Question Answering," which is available at arxiv.org/abs/1703.04816 and which is incorporated by reference herein in its entirety.

2. Search Pruning and Type-Aware Data Augmentation

Type Swaps, a data-augmentation strategy embodiment presented herein, offers a way to incorporate the nature of the question and the types of named entities in the answers into the learning process of model embodiments and reduce sensitivity to surface variation. Existing neural-network approaches to extractive QA have so far ignored this information. This type of augmentation helps sharpen the search process and improve performance by providing better coverage of different answer types. Growing the number of augmented samples used improved the performance of all models under study (see Table 4). Past a certain amount of augmentation, the performance degradation was observed, thereby suggesting that despite efforts to closely mimic the original training set, there is a train-test mismatch in the data distribution or too much duplication in the generated examples.

Nonetheless, with $T \in [10^4, 5 \times 10^4]$, (EM, F1) improve from (65.8→66.7, 74.0→75.0) for locally normalized models, and (66.6→68.4, 75.0→76.2) for globally normalized models. While the experiments were conducted on a single architecture, this source of improvement is not tied to embodiment architecture choices, and thus these benefits are expected to carry over to different models (e.g., [6] Weissenborn et al., 2017; [5] Seo et al., 2016; [3] Xiong et al., 2016), and perhaps more broadly in other natural language tasks that contain named entities and have limited supervised data.

3. Beam Search and Conditional Computation

One of the assertion made herein was that search-based models that rely on global normalization that a search-based model that is trained with beam search, with recurrent neural networks and computation conditional on the search path, can successfully compete or outperform costlier approaches. This assertion is supported in at least two ways: first it should be noticed that the top performing model embodiments in Table 2 outperformed previous approaches with the exception of [5] (Seo et al., 2016) and [6] (Weissenborn et al., 2017), while only considering spans in its search beam. Second, the effect of Beam Width on the trainability of a globally normalized model was considered, and it was noticed that this has a strong effect on the ability to train conditional computation: locally normalized models, where only inference is affected by beam width see their performance drop slightly when switching between (EM 66.7→65.7 and F1 75.0→74.8), whereas globally normalized models, where beam width affects how often early updates need to be made, suffer much more from training with a small beam width 1 (EM 68.4→58.8 and F1 76.2→68.4 when B=32→1).

F. Related Work

Learning to Search. Several approaches to learning to search have been proposed for various Natural Language Processing (NLP) tasks and conditional computation. Most recently, some have demonstrated the effectiveness of globally normalized networks and training with beam search for part of speech tagging and transition-based dependency parsing, while others showed that these techniques could also be applied to sequence-to-sequence models in several application areas including machine translation. These works focus on parsing and sequence prediction tasks and have a fixed computation regardless of the search path, while it is shown herein that such techniques may also be applied to question answering and extended to allow for conditional computation based on the chosen search path.

Learning to search has also been used in context of modular neural networks with conditional computation for image captioning. Reinforcement learning was used to learn how to turn on and off computation, while it has been found herein that conditional computation may be learned with maximum likelihood and the help of early updates to guide the training process.

Extractive Question Answering. Since the introduction of the SQuAD dataset (see [1] Rajpurkar et al., 2016), numerous systems have achieved strong results. Some make use of bi-directional attention mechanisms, whereas GNR embodiments herein are more lightweight and achieves similar results without this type of attention mechanism. The document representation used by GNR embodiments is similar to [4] (Lee et al. (2016)). However, both [4] (Lee et al. (2016)) and [2] (Wang and Jiang (2016)) must score all $O(N^2)$ possible answer spans, making training and inference expensive. GNR embodiments presented herein avoid this complexity by learning to search during training and outperform both systems while scoring only $O(|B|)$ spans. [6] (Weissenborn et al. (2017)) is a locally normalized model that first predicts start and then end words of each span. The experiments conducted herein indicate that further factorizing the problem and using global normalization along with an embodiment of the data augmentation approach presented herein would yield corresponding improvements.

Data Augmentation. Several works have used data augmentation as a technique for controlling generalization error of deep learning models. Some use a thesaurus to generate new training examples based on synonyms. Other employ a similar method, but uses Word2vec and cosine similarity to find similar words. Yet others use a high-precision synchronous context-free grammar to generate new semantic parsing examples. The data augmentation technique disclosed herein, Type Swaps, is unique in that it leverages an external knowledge-base to provide new examples that have more variation and finer-grained changes than methods that use only a thesaurus or Word2Vec, while also keeping the narrative and grammatical structure intact.

More recently some have proposed a sequence-to-sequence model to generate diverse and realistic training question-answer pairs on SQuAD. While somewhat similar to this approach in that techniques make use of existing examples to produce new examples that are fluent, however embodiments herein are also able to explicitly incorporate entity type information into the generation process and use the generated data to improve the performance of question answering models.

G. System Embodiments

In embodiments, aspects of the present patent document may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 13:
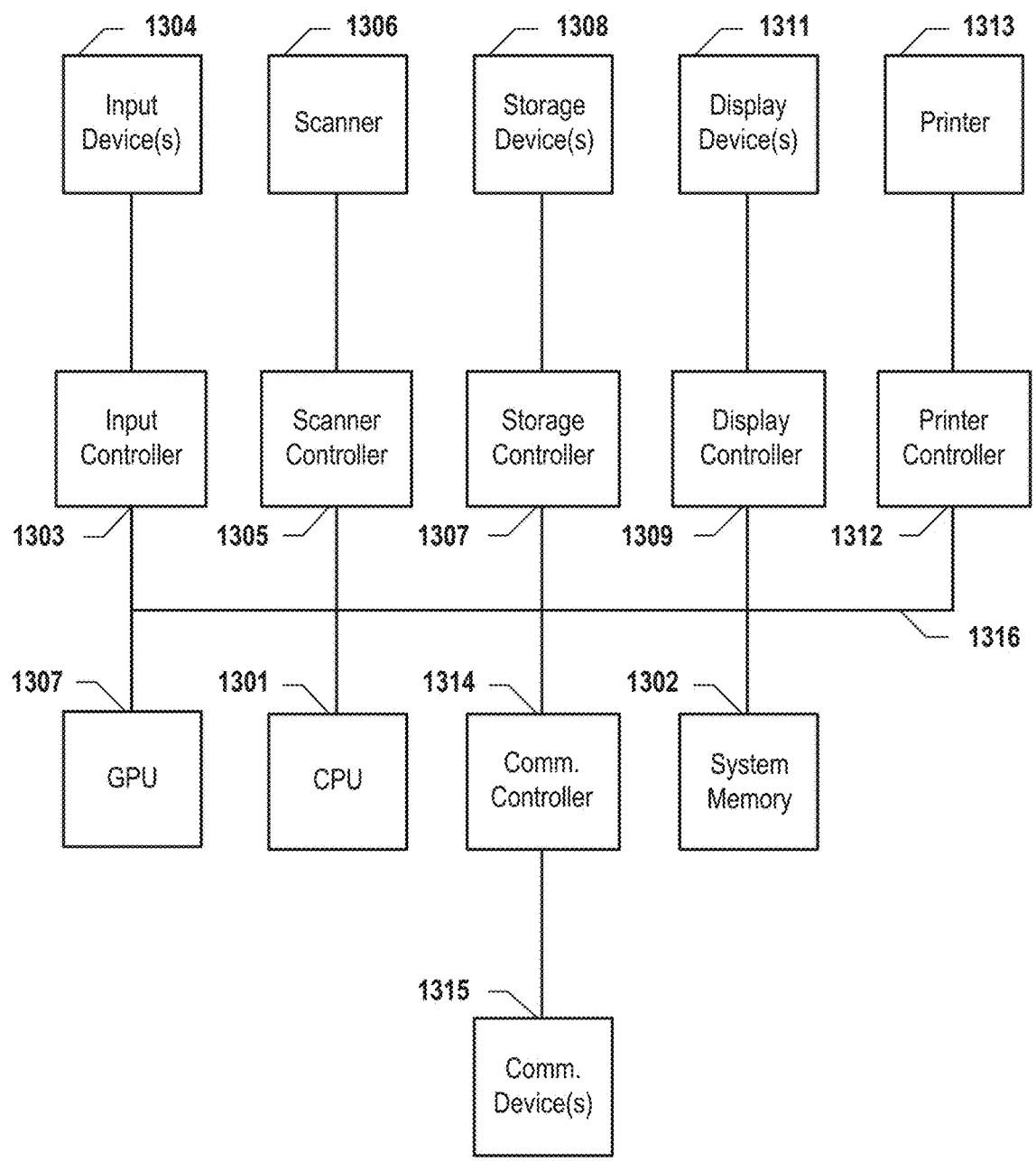
FIG. 13 depicts a simplified block diagram of a computing device/information handling system, in accordance with embodiments of the present disclosure.

FIG. 13 depicts a simplified block diagram of a computing device/information handling system (or computing system) according to embodiments of the present disclosure. It will be understood that the functionalities shown for system 1300 may operate to support various embodiments of an information handling system—although it shall be understood that an information handling system may be differently configured and include different components.

As illustrated in FIG. 13, system 1300 includes one or more central processing units (CPU) 1301 that provides computing resources and controls the computer. CPU 1301 may be implemented with a microprocessor or the like, and may also include one or more graphics processing units (GPU) 1317 and/or a floating-point coprocessor for mathematical computations. System 1300 may also include a system memory 1302, which may be in the form of random-access memory (RAM), read-only memory (ROM), or both.

A number of controllers and peripheral devices may also be provided, as shown in FIG. 13. An input controller 1303 represents an interface to various input device(s) 1304, such as a keyboard, mouse, or stylus. There may also be a scanner controller 1305, which communicates with a scanner 1306. System 1300 may also include a storage controller 1307 for interfacing with one or more storage devices 1308 each of which includes a storage medium such as magnetic tape or disk, or an optical medium that might be used to record programs of instructions for operating systems, utilities, and applications, which may include embodiments of programs that implement various aspects of the present invention. Storage device(s) 1308 may also be used to store processed data or data to be processed in accordance with the invention. System 1300 may also include a display controller 1309 for providing an interface to a display device 1311, which may be a cathode ray tube (CRT), a thin film transistor (TFT) display, or other type of display. The computing system 1300 may also include a printer controller 1312 for communicating with a printer 1313. A communications controller 1314 may interface with one or more communication devices 1315, which enables system 1300 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1316, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

H. Some Conclusions

Provided herein were embodiments of methodologies that can overcome several of the limitations of existing approaches to extractive Question Answering by reducing the computational complexity, being type-aware, and allowing models that can operate without needing to process the entire document. In experiments, evidence was found that extractive question answering can be done using learning-to-search techniques, and that doing so with global normalization can lead to near state-of-the-art results. Furthermore, it was found that a type-aware data augmentation strategy improves the performance of all models under study on the SQuAD dataset, while certain embodiments of the method have an assumption that the training data contains named entities from a large KB. The methodology disclosed herein is general and it may be applied on other NLP tasks that would benefit from more training data.

It should be noted that embodiments of the presented GNR model may be applied to other question answering datasets such as MS MARCO or NewsQA. Also, it shall be noted that other tasks, such as Named Entity Recognition, Entity Linking, Machine Translation, or Summarization, may benefit from the use of Type Swaps. Finally, one skilled in the art shall also recognize that there is a broad range of structured prediction problems (code generation, generative models for images, audio, or videos) where the size of original search space makes current techniques intractable, but if cast as learning-to-search problems using beam-search, global normalization, and conditional computation, are now within reach.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for selecting an answer given an input question, the method comprising:
    encoding the input question to obtain a question representation;
    for each document from a set of documents, encoding the document to produce a sequence of hidden states to represent each word in the document;
    obtaining a sentence score for each sentence of the document, each sentence of the document is represented by the hidden states of the first and last word in the sentence;
    selecting a set of the sentences among all sentences based on the sentence scores;
    obtaining a start word score for each word in the selected sentences;
    for each selected sentence, summing the sentence score and the start word score for each word respectively to get a plurality of summation scores;
    selecting a set of the words from words of all selected sentences as start words based on the summation scores;
    obtaining end word scores for a plurality of spans, each span starting from one start word and ending at a remaining word after the start word;
    selecting candidate spans from the plurality of spans based on a combination of sentence score, start word score, and end word score for each span;
    for each candidate span, generate a globally normalized probability; and
    selecting one or more span as the answer based on the globally normalized probabilities.

2. The computer-implemented method of claim 1 wherein the combination of sentence score, start word score, and end word score is a summation of the sentence score, the start word score, and the end word score.

3. The computer-implemented method of claim 1 wherein encoding the input question to obtain a question representation comprising:
    running a stack of bidirectional bi-directional Long Short-Term Memory (Bi-LSTM) layers over each word in the question;
    producing hidden states for each word;
    using the hidden states to compute a passage-independent question embedding; and
    obtaining the question representation by concatenating the final hidden states of the forward and backward LSTMs and the passage-independent question embedding.

4. The computer-implemented method of claim 3 wherein the document is encoded by a separate stack of Bi-LSTM layers running over the entire document to produce the sequence of hidden states.

5. The computer-implemented method of claim 4 wherein each word in the document is represented as the concatenation of its word vector, a vector of the question, a first Boolean feature indicating if the word also appears in the question, and a second Boolean feature indicating if the word is repeated in the document.

6. The computer-implemented method of claim 4 wherein each sentence of the document is represented by the hidden states of the first and last word in the sentence for the backward and forward LSTM respectively.

7. The computer-implemented method of claim 6 wherein the sentence score is obtained by passing the sentence representation through a fully connected layer.

8. The computer-implemented method of claim 1 wherein the start word score is obtained by passing a hidden state of each word in the selected sentences through a fully connected layer.

9. The computer-implemented method of claim 1 wherein obtaining end word scores for spans starting from one start word comprising:
    running a Bi-LSTM over hidden states of remaining words after the starting word in the selected sentence to produce representations for the remaining words; and
    passing the representations through a fully connected layer to obtain end word scores for spans ending in each remaining word.

10. The computer-implemented method of claim 1 wherein the globally normalized probability is obtained by global normalization over all spans.

11. A computer-implemented method for selecting an answer from a document given an input question, the method comprising:
   obtaining a plurality of candidate spans within the document, each span starts from a start word in a selected sentence of the document and ends at an end word, the end word is a remaining word after the start word in the selected sentence, each start word is associated with a start word score, each end word is associated with end word score, each selected sentence is associated with a sentence score;
   obtaining an answer score for each candidate span by aggregating the sentence score, the start word score, and the end word score associated to the candidate span;
   exponentializing the answer scores for each candidate span;
   creating a partition function by summing all exponentialized answer scores;
   using the partition function to globally normalize each exponentialized answer score for each candidate span; and
   selecting one or more candidate spans as the answer based on the globally normalized answer scores.

12. The computer-implemented method of claim 11 wherein aggregating the sentence score, the start word score, and the end word score is implemented by a summation of the sentence score, the start word score, and the end word score.

13. The computer-implemented method of claim 11 wherein the sentence score is obtained by passing a sentence representation for the sentence through a fully connected layer, the sentence representation is obtained by hidden states of the first and last word in the sentence for the backward and forward LSTM respectively.

14. The computer-implemented method of claim 11 wherein the start word score is obtained by passing a hidden state of the start word through a fully connected layer.

15. The computer-implemented method of claim 14 wherein hidden state of the start word is concatenated from its word vector, a vector of the question, a first Boolean feature indicating if the word also appears in the question, and a second Boolean feature indicating if the word is repeated in the document.

16. A computer-implemented method for training a model in question answering, the method comprising:
   given a question and a document, obtaining a plurality of candidate spans within the document, each span starts from a start word in a selected sentence of the document and ends at an end word, the end word is a remaining word after the start word in the selected sentence, each start word is associated with a start word score, each end word is associated with end word score, each selected sentence is associated with a sentence score;
   globally normalizing each candidate span based on an answer score of each candidate span, the answer score is summed from the sentence score, the start word score, and the end word score associated with each candidate span;
   selecting one or more candidate spans as the answer based on the globally normalized answer scores;
   locating named entities in the document and the question;
   collecting surface variation for each entity type;
   generating one or more new document-question pairs by swapping each named entity in an original triplet with a surface variant that shares the same type from the collection; and
   repeating the procedures of obtaining candidate spans, globally normalizing for candidate spans, and selecting one or more candidate spans as answer for the one or more new document-question pairs.

17. The computer-implemented method of claim 16 wherein the named entities in the document and the question are contained in a knowledge base (KB).

18. The computer-implemented method of claim 17 wherein the named entities in the document and the question are located by string-match with entities in the KB.

19. The computer-implemented method of claim 16 wherein collecting surface variation for each entity type comprising assigning number types to nominal groups that contain dates, numbers, or quantities.

20. The computer-implemented method of claim 16 wherein in collecting surface variation for each entity type, only variations where the question or answer is mutated are kept.

* * * * *